No. 775,831. PATENTED NOV. 22, 1904.
J. LEFLER.
VEHICLE WHEEL.
APPLICATION FILED MAR. 21, 1904.
NO MODEL. 2 SHEETS—SHEET 1.
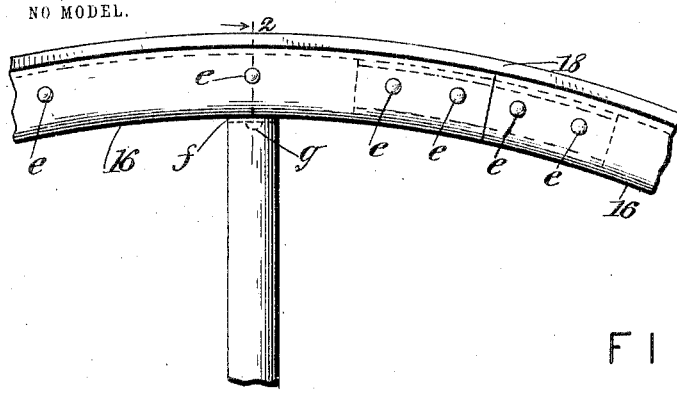
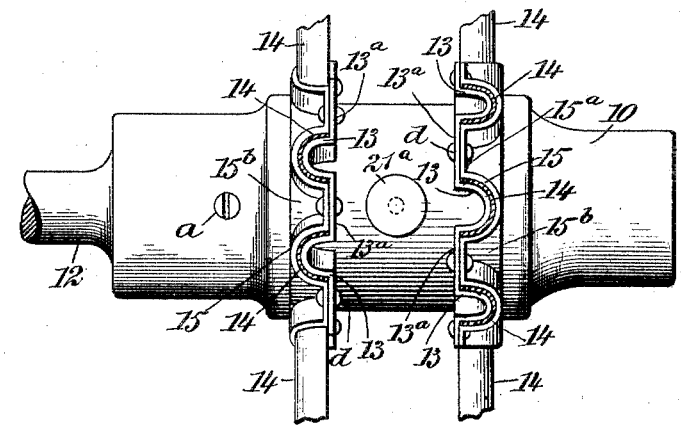
FIG. 1.
FIG. 3.
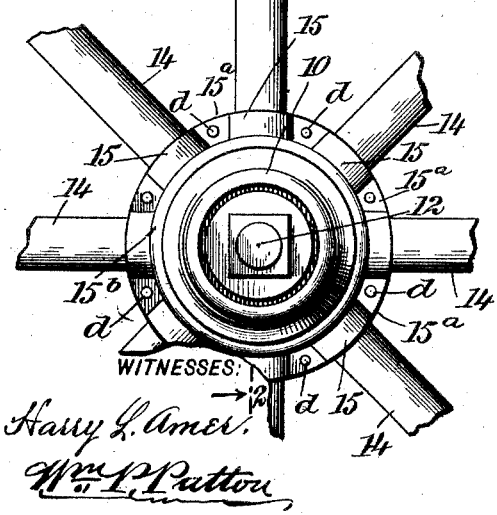
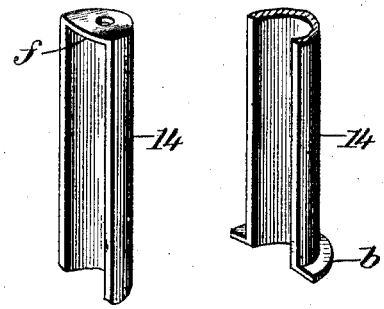
FIG. 4. FIG. 5.
WITNESSES:
Harry L. Ames
Wm. L. Patton
INVENTOR
John Lefler
BY
ATTORNEYS No. 775,831. PATENTED NOV. 22, 1904.
J. LEFLER.
VEHICLE WHEEL.
APPLICATION FILED MAR. 21, 1904.
NO MODEL. 2 SHEETS—SHEET 2.

WITNESSES:
Harry L. Amer.
Wm. L. Patton

INVENTOR
John Lefler
BY Munn
ATTORNEYS

No. 775,831.

Patented November 22, 1904.

UNITED STATES PATENT OFFICE.

JOHN LEFLER, OF SAN BERNARDINO, CALIFORNIA.

VEHICLE-WHEEL.

SPECIFICATION forming part of Letters Patent No. 775,831, dated November 22, 1904.

Application filed March 21, 1904. Serial No. 199,079. (No model.)

*To all whom it may concern:*

Be it known that I, JOHN LEFLER, a citizen of the United States, and a resident of San Bernardino, in the county of San Bernardino and State of California, have invented a new and Improved Vehicle-Wheel, of which the following is a full, clear, and exact description.

My invention relates to a class of vehicle-wheels embodying sheet metal in their construction, and has for its object to provide novel details of construction for a vehicle-wheel of the character indicated which afford very light strong shapely wheels that may be employed as parts of a light or heavy vehicle, a further object being to so construct details of the improved wheel as to provide an improved means for automatically lubricating the axle-spindle while the wheel is in motion.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 7:
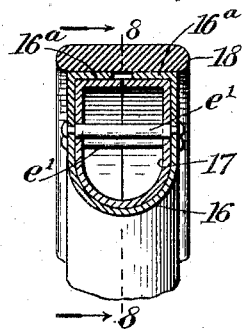
Figure 6:
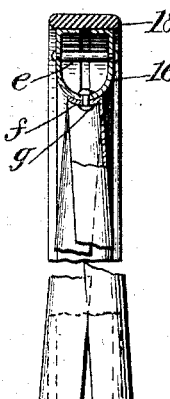
Figure 6:
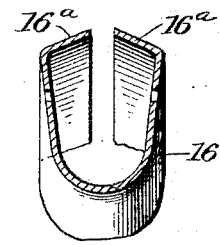
Figure 8:
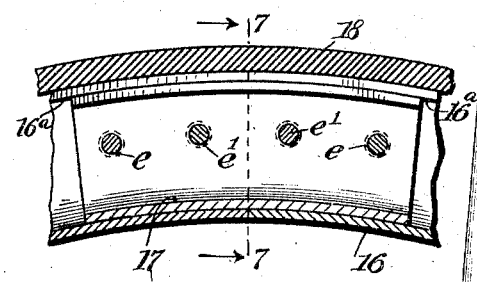
Figure 9:
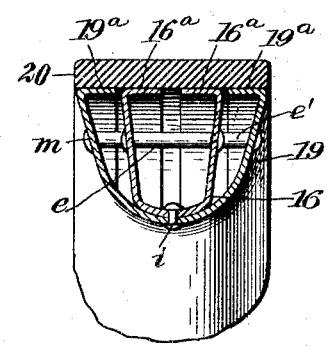
Figure 2:
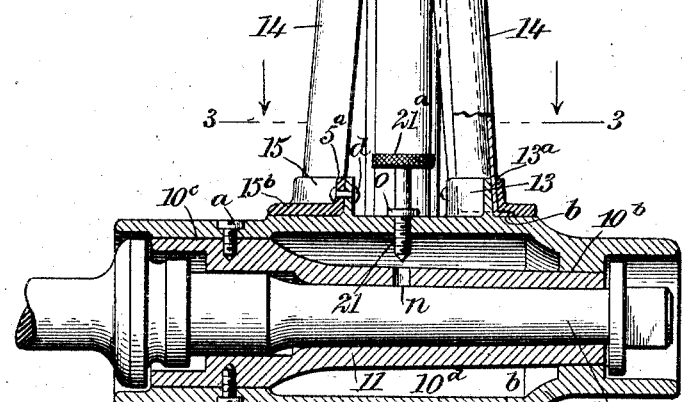

Figure 1 is a side view of a portion of a vehicle-wheel having features of the improvement. Fig. 2 is a transverse sectional view in part of a vehicle-wheel embodying details of the invention, taken substantially on the line 2 2 in Fig. 1. Fig. 3 is a partly sectional plan view showing the vehicle-hub and means for connecting the spokes of the wheel thereto, taken substantially on the line 3 3 in Fig. 2. Figs. 4 and 5 are perspective views, respectively, of end portions of one of the spokes employed and which engage the wheel-rim and wheel-hub and are thereto secured. Fig. 6 is a transverse sectional view of a portion of the wheel-rim, showing the initial set of duplicate flanges thereon which support the tire of the wheel when it is shrunk thereon. Fig. 7 is a transverse sectional view of the wheel-rim, tire thereon, and of a coupling-thimble that is employed to join together the meeting ends of the wheel-rim sections, the line of section being indicated at 7 7 in Fig. 8. Fig. 8 is a longitudinal sectional view of details shown in Fig. 7, taken substantially on the line 8 8 in said figure; and Fig. 9 is a transverse sectional view of a wheel-rim embodying details of the invention and showing an additional feature thereof which is employed in the construction of vehicle-wheels that sustain heavy loads and are provided with broad-faced tires.

The hub 10 of the improved vehicle-wheel is of well-known external form, having its body portion $10^a$, that intervenes the end portions, preferably rendered cylindrical and the latter of somewhat less diameter than the cylindrical median portion. To afford proper strength with minimum weight, the hub 10 is cast hollow, of a suitable metal, and cored to produce a shell of proper thickness that is increased at two points, respectively, near the outer and inner ends of the hub-shell, thus providing collars $10^b$ $10^c$ at said points that are rendered true on their surfaces and receive the elongated box-bearing 11, which is therein fitted closely and held concentric with the longitudinal axis of the hub by the set-screws $a$. (Shown in Fig. 2.)

The box-bearing 11 is bored true and of suitable shape interiorly to receive and rotatably support an axle-spindle 12, that is held within said box by a nut on the forward end of the spindle, as usual.

The interior diameter of the hub 10 between the collars $10^b$ $10^c$ affords an annular chamber $10^d$, which spaces the bearing-box 11 from the inner surface of the hub between said collars and provides an oil-chamber for lubrication of the spindle 12, as will be hereinafter more fully explained. On the exterior of the hub 10, at points equally spaced from the longitudinal center thereof, two similar radial flanges are formed, each flange consisting of a series of substantially semicircular abutment-walls 13, that are of similar dimensions and are spaced apart evenly by the intervening straight webs $13^a$.

It will be seen in Figs. 1 and 3 that the semicircular abutments 13, which are portions of each radial flange on the hub 10, are produced by curved indents formed in the inner sides of the flanges—that is to say, the sides nearest to the longitudinal center of the hub— and by forming corresponding convex outer sides thereon. The number of spaced semicircular abutments 13 in each radial flange is equal to the number of wheel-spokes 14 that are to be supported thereby, as will presently be described, and said spokes of similar form are each constructed of plate metal essentially as follows:

A plate-metal blank of proper length and width, that is slightly tapered from the end of the spoke which engages the hub toward the other end thereof, is bent by suitable dies, so as to give the spoke substantially U shape in cross-section, one end of each spoke being adapted to fit neatly against an abutment 13 it is to be secured upon. The end of each spoke 14 that engages a corresponding abutment 13 is formed with a flange $b$, that is turned outward and in service affords a seat for the spoke end on the hub, said flange being concaved on the lower side to adapt it to have a proper bearing upon the convex surface of the hub.

A clamp in ring form is provided to secure the set of spokes 14 that engage abutments 13 on each radial ring in contact with said abutments. To this end the clamping-rings are each formed with essentially U-shaped clamping members 15, that are each adapted to receive the lower portion of a spoke 14 and embrace it, these clamping members being spaced apart a proper distance by intervening integral webs $15^a$, and it is to be understood that the clamping-rings may each be formed as a closed ring or be made up of two or more sections, if preferred. Each clamping-ring is formed with an outwardly-projecting base-flange $15^b$, that seats upon the hub 10 and extends around it. In the lower side of each base-ring $15^b$ a shallow recess is formed below each clamping member 15 and neatly receives the flange $b$ of a spoke 14, that is to be held in place by said clamping member. Each clamping-ring is secured upon or against a series of spokes 14 by rivets $d$, that are inserted through perforations in the spacing members or webs $13^a$ $15^a$, which are disposed oppositely in pairs, said rivets when properly riveted at their ends serving to forcibly bind the series of webs $15^a$ upon the opposed set $13^a$, whereby the spokes for a wheel are held very securely and firmly bound upon the hub 10, so as to radiate therefrom in two series, which are caused to incline toward a wheel-rim they engage with their outer ends. The wheel-rim is formed of plate metal bent from a blank of proper width and length into substantially U shape in cross-section, and while said rim may be formed in a single piece that is given ring form and joined together at the ends thereof it is preferred to construct the wheel-rim in a plurality of sections 16, formed of suitable blanks of plate metal, each shaped by proper means so as to represent like arcs of a circle having a diameter that equals that of the wheel less double the thickness of the tire that is to be mounted upon the wheel-rim.

Each of the preferably similar sections 16 that when joined together in sequence form the wheel-rim and are essentially U-shaped in cross-section has its edge portions bent inwardly or toward each other, thus forming like flanges $16^a$, that gap apart somewhat when the rim-sections are formed, the opposite sides of the rim-sections at this stage being slightly inclined outward, as is clearly represented in Fig. 6. The ends of the rim-sections 16 are joined together without lapping them on each other by means of a coupling-sleeve 17, provided for each rim-joint. Each of the similar coupling-sleeves 17 is tubular and of such peripheral form as to adapt it to fit closely within the end portions of two wheel-rim sections which said coupling-sleeve is to hold joined together endwise, the exterior of the coupling-sleeve having an intimate contact with the inner surface of the rim-sections and with the flanges $16^a$ thereon when the latter are compressed by the wheel-tire, as will be hereinafter described. The side walls of the coupling-sleeves 17 are held from springing laterally by the rivets $e$, that are inserted through opposite perforations in said walls and are riveted at their outer ends.

Each coupling-sleeve 17 is of such a length as will permit it to have a proper surface of contact within each end portion of the abutting rim-sections 16. In each of the side walls of the rim-sections two spaced perforations are formed for the reception of the reduced end portions of the shouldered rivets, the thicker bodies of which pass through perforations in the sides of the coupling-sleeves and seat at their shoulders on the inner surfaces of the sides of the rim-sections. The projecting end portions of the reduced bodies of the rivets are to be riveted over upon the outer sides of the rim-sections, as is clearly shown in Fig. 7, the relative positions of the spaced shouldered rivets $e$ being indicated in Fig. 8, and it will be seen that when the rivets $e$ are firmly secured at their ends in the sides of the rim-sections 16 said sides will be firmly compressed against the coupling-sleeves and the latter will effect a strong reliable coupling between the impinging ends of the rim-sections. The outer end of each of the spokes 14 is closed by an integral transverse wall $f$, as indicated in Fig. 4, and it is of advantage to render the exterior surface of said end wall concave and of such curvature as will adapt it to be forced into intimate contact with the rounded inner side of the wheel-rim at a point whereon the spoke end is to be secured. The end wall $f$ of each spoke 14 is perforated centrally, and at a suitable point the wheel-rim is correspondingly perforated, these perforations in the rim and end walls of respective spokes being caused to register by pressing the ends of the spokes laterally and into engagement with the curved surface of the wheel-rim, so that a rivet *g* may be inserted and secured in the alined perforations in the wheel-rim and spokes by riveting the ends of the rivets, as shown for one rivet in Fig. 2.

In assembling the sections of the wheel-rim it is of advantage to first secure one end portion of each coupling-sleeve 17 to an end portion of the rim-section by the rivets *e*, leaving the other end of each coupling-sleeve free to move slightly endwise in the end portion of the rim-section it occupies. The wheel-rim is now in condition to receive the tire 18, which may be and preferably is in the form of an integral circular band of steel or other suitable metal having a width proportioned to the other portions of the vehicle-wheel and a proper thickness to insure durability. The diameter of the tire 18 internally is so proportioned that in a cold condition the tire cannot be mounted upon the wheel-rim 16; but by expanding said tire with applied heat it may be forced over the wheel-rim. The tire is now cooled, and thus is contracted so as to resume its normal diameter, the contraction of the tire serving to compress the flanges $16^a$, and thus render them level, providing a proper support for the tire that is compressed thereon. The contraction of the tire 18 serves to correspondingly contract the diameter of the wheel-rim and force the free ends of the coupling-sleeves 17 slightly farther into the rim-sections they occupy, this endwise movement of the coupling-sleeves being arrested when the ends of the rim-sections are forcibly impinged upon each other. The perforations that were formed to receive rivets for securing the remaining ends of the coupling-sleeves upon the end portions of the rim-sections they are within should now be disposed opposite each other, so that rivets *e* may be inserted therethrough and secured by riveting over the projecting ends of said rivets. It will be seen that the compression of the tire 18 consolidates the several component parts of the wheel and puts them under such tensional and torsional strain as to render the wheel unyielding at the joints between its several parts, whereby the wheel is strengthened and all details of the same coact to produce an extremely light, strong, shapely, and durable vehicle-wheel.

The desired construction affords a wheel well adapted for passenger-vehicles or light freight-wagons; but when the improved construction is to be employed for the production of wheels suitable for the heaviest freight-wagons it is preferred to reinforce the wheel-rims, as shown in Fig. 9. In this modified form of the wheel the wheel-rim sections 16 are coupled together, so as to render them practically continuous, by means of the coupling-sleeves 17, as hereinbefore described, and the sides of said rim-sections are stiffened by the transverse shouldered rivets *e*, that are secured in place before the tire is placed upon the wheel-rim.

To increase the width of the wheel-rim, a second series of rim-sections 19 is provided, these rim-sections preferably being equal in number to the set of rim-sections 16. As shown, these rim-sections 19 are wider between their side walls than the width of the rim-sections 16 between their side walls and have inwardly-turned flanges $19^a$ formed thereon similar to the flanges $16^a$. The space between the inner edges of the flanges $19^a$ is such that the rim-sections 19 may be successively mounted upon the rim-sections 16 by inserting the latter through the openings between the flanges $19^a$ of each corresponding rim-section 19 when the latter are passed outwardly thereover. The reinforcing rim-sections 19 are preferably arranged so as to locate the joints between their impinging ends intermediately of like joints between the rim-sections 16, and, as shown in Fig. 9, the rounded walls of the two series of rim-sections 16 19 are held secured together by a suitable number of rivets *i*. The side walls of the reinforcing rim-sections 19 are connected together by shouldered rivets *m*, that pass through perforations in the side walls of the rim-sections 16. Preferably the wheel-rim, composed of the two sets of rim-sections 16 19, is formed by assembling said rim-sections before the rim is mounted upon the spokes of the wheel. Then the rim is secured upon outer ends of the latter, as hereinbefore explained. The wheel-rim flanges $16^a$ $19^a$ are now disposed in the same plane, transversely considered, and are thus adapted to receive a tire, such as 20.

The tire 20 is a continuous ring of bar metal having a width slightly exceeding the width of the wheel-rim sections 19 and is of such an interior diameter that it must be expanded by heat to pass over the rim-flanges $16^a$ $19^a$, whereon the tire may be firmly secured by cooling and contracting it. While it is preferred to shrink the tire on the wheel-rim, it may also be pressed thereon by provision of suitable means.

It will be obvious that the provision of an additional series of rim-sections 19 increases the dimensions of the wheel-rim and renders it more capable of sustaining a heavy load, and it is to be understood that the tire, spokes, and hub of the wheel are to be proportionately increased in size, thus providing a light strong durable metal vehicle-wheel that may be employed in suitable number as parts of a heavy wagon for the transportation of freight.

Referring again to the particular construction of the hub 10, it will be seen in Fig. 2 that the wall of the hub is perforated near its longitudinal center, and in the box 11 a similar perforation *n* is formed directly opposite the perforation in the hub-wall, and the latter is threaded to receive a valve. The valve provided consists of a cylindrical body-piece 21, that is threaded and tapered at one end, the opposite end having a thumb-piece 21ª thereon. There is a set-nut $o$ screwed upon the body of the valve, and the latter is screwed into the threaded perforation in the wall of the hub 10, so that the tapered end of the valve-body is located near to the perforation $n$ in the box 11, the contact of the set-nut $o$ with the hub-wall serving to hold the valve at a desired point of longitudinal adjustment.

It will be seen that if the annular chamber $10^d$ is supplied with a suitable lubricating liquid the rotatable movement of the vehicle-wheel will cause the valve-body 21 to become freely coated with the lubricant, which will by gravity flow down the same and drop through the perforation $n$ in the box 11, thus periodically and automatically supplying a small quantity of the lubricant to the axle-spindle 12.

Having thus described my invention, I claim as new and desire to secure by Letters Patent—

1. In a vehicle-wheel, the combination with a hub, of a substantially U-shaped spoke, a radial flange formed on the lower end of said spoke, and means for securing the flange and said end of the spoke upon the exterior of the hub.

2. In a vehicle-wheel, the combination with a hub and two spaced radial flanges on an intermediate portion of the hub, each flange comprising a series of U-shaped abutments spaced apart by straight webs, of two series of U-shaped plate-metal spokes, each spoke having a radial flange on the lower end, said ends of the spokes embracing the U-shaped abutments, and a clamping-flange for each set of spokes, said flanges each having a series of U-shaped members spaced apart by straight webs, and respectively embracing the convex side of a spoke, and means for securing the clamping-flanges upon the radial flanges so as to hold the spokes clamped between the abutments and U-shaped members, and the flanges on the spoke ends seated upon the hub.

3. In a vehicle-wheel, a series of plate-metal spokes, each spoke being U-shaped in cross-section, a radial flange projected from one end of each spoke, and a transverse perforated and dished wall on the opposite end of each spoke.

4. In a vehicle-wheel, a wheel-rim formed of plate metal in sections that represent arcs of a circle and are U-shaped in cross-section, each rim-section having its edge portions turned inward providing seating-flanges, plate-metal coupling-sleeves each fitted neatly within impinging ends of the rim-sections, rivets passed through sides of the rim-sections and of the sleeves which secure the rim-sections clamped upon the sleeves, a series of reinforcing rim-sections incasing the rim they reinforce, said reinforcing rim-sections each having inwardly-bent flanges that afford laterally-extended seating-surface, means for securing the reinforcing rim-sections upon the main rim-sections, and a tire compressed upon the inwardly-bent seating-flanges.

In testimony whereof I have signed my name to this specification in the presence of two subscribing witnesses.

JOHN LEFLER.

Witnesses:
   J. L. MACK,
   H. L. BARKELEW.